(12) United States Patent
Higuchi et al.

(10) Patent No.: US 9,919,394 B2
(45) Date of Patent: Mar. 20, 2018

(54) WYθ TABLE APPARATUS

(71) Applicant: NSK Ltd., Shinagawa-ku, Tokyo (JP)

(72) Inventors: Hideya Higuchi, Fujisawa (JP); Tsuyoshi Nakamura, Fujisawa (JP)

(73) Assignee: NSK Ltd., Tokyo (JP)

( * ) Notice: Subject to any disclaimer, the term of this patent is extended or adjusted under 35 U.S.C. 154(b) by 51 days.

(21) Appl. No.: 15/105,010

(22) PCT Filed: Dec. 16, 2014

(86) PCT No.: PCT/JP2014/006263
§ 371 (c)(1),
(2) Date: Jun. 16, 2016

(87) PCT Pub. No.: WO2015/093046
PCT Pub. Date: Jun. 25, 2015

(65) Prior Publication Data
US 2016/0318140 A1    Nov. 3, 2016

(30) Foreign Application Priority Data

Dec. 17, 2013 (JP) ................................. 2013-260021

(51) Int. Cl.
*G05G 11/00* (2006.01)
*B23Q 1/48* (2006.01)
(Continued)

(52) U.S. Cl.
CPC ................ *B23Q 1/48* (2013.01); *B23Q 1/40* (2013.01); *B23Q 1/62* (2013.01); *F16C 29/00* (2013.01); *F16C 29/04* (2013.01)

(58) Field of Classification Search
CPC .......... F16C 29/00; F16C 29/04; B23Q 1/623; B23Q 1/40; B23Q 1/48; B23Q 1/62
See application file for complete search history.

(56) References Cited

U.S. PATENT DOCUMENTS

| 5,036,723 A * | 8/1991 | Matsumoto | .............. B23Q 1/40 |
| | | | 108/137 |
| 5,323,712 A * | 6/1994 | Kikuiri | .................... B23Q 1/48 |
| | | | 108/138 |

(Continued)

FOREIGN PATENT DOCUMENTS

| JP | 8-99243 A | 4/1996 |
| JP | 9-155666 A | 6/1997 |

(Continued)

OTHER PUBLICATIONS

International Preliminary Report on Patentability (PCT/IB/338 & PCT/IB/373) issued in PCT Application No. PCT/JP2014/006263 dated Jun. 30, 2016, including English translation of document C2 (Japanese-language Written Opinion (PCT/ISA/237)) previously filed on Jun. 16, 2016 (six pages).

(Continued)

*Primary Examiner* — Jake Cook
(74) *Attorney, Agent, or Firm* — Crowell & Moring LLP

(57) ABSTRACT

One first drive unit that advances or recedes in the X-direction and that exerts a drive force in the X-direction to a movable table is arranged to exert a drive force to a center position in the Y-direction of one end part in the X-direction of the movable table. Two second drive units that advance or recede in the Y-direction that is perpendicular to the X-direction, and that exert the drive forces in the Y-direction to the movable table are arranged to be point-symmetric with respect to the center of the movable table as the center of symmetry. Plural plane guide bearings are arranged at positions such that the total sum of the moment forces of the respective plane guide bearings is zero on the center axis line in the X-direction of the movable table.

6 Claims, 4 Drawing Sheets

(51) Int. Cl.
*B23Q 1/40* (2006.01)
*B23Q 1/62* (2006.01)
*F16C 29/00* (2006.01)
*F16C 29/04* (2006.01)

(56) References Cited

U.S. PATENT DOCUMENTS

| | | | |
|---|---|---|---|
| 5,524,502 A * | 6/1996 | Osanai | B23Q 1/38 108/141 |
| 6,155,716 A | 12/2000 | Okamura et al. | |
| 2004/0187743 A1 | 9/2004 | Kanehira | |

FOREIGN PATENT DOCUMENTS

| | | |
|---|---|---|
| JP | 11-245128 A | 9/1999 |
| JP | 2001-350278 A | 12/2001 |
| JP | 2004-301256 A | 10/2004 |
| JP | 2009-63540 A | 3/2009 |

OTHER PUBLICATIONS

International Search Report (PCT/ISA/210) issued in PCT Application No. PCT/JP2014/006263 dated Mar. 24, 2015 with English translation (five pages).

Japanese-language Written Opinion (PCT/ISA/237) issued in PCT Application No. PCT/JP2014/006263 dated Mar. 24, 2015 (three pages).

Extended European Search Report issued in counterpart European Application No. 14870902.5 dated Aug. 31, 2017 (six pages).

* cited by examiner

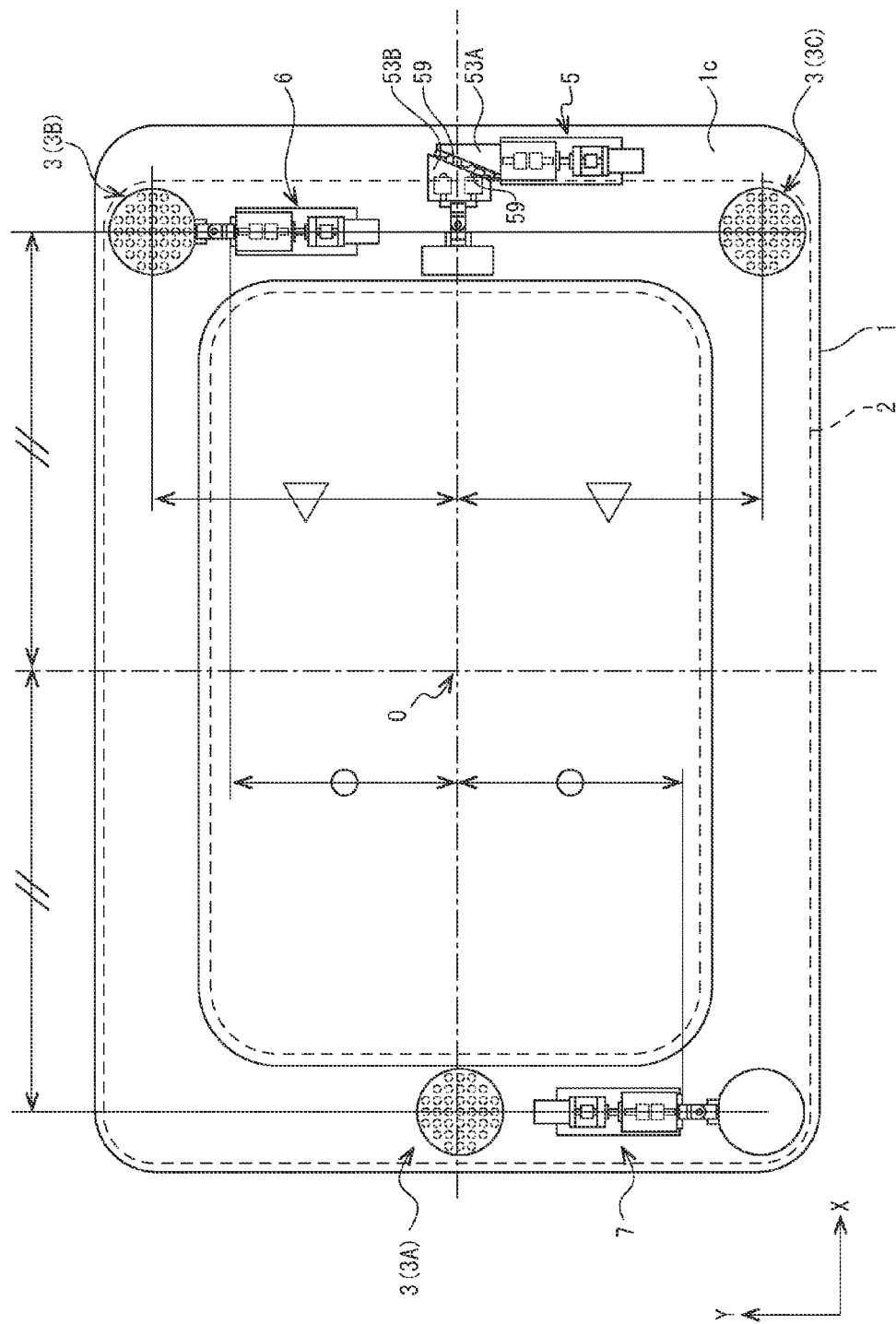

WYθ TABLE APPARATUS

TECHNICAL FIELD

The present invention relates to an XYθ table apparatus.

BACKGROUND ART

The XYθ table apparatus used as an alignment table includes a base, a movable table, and a plane guide bearing. The movable table movably supported by the plane guide bearing moves linearly and rotationally in a given plane above the base. Such a movement of the movable table is made by plural drive units applying drive forces to the movable table.

Patent Literatures 1 and 2 disclose the XYθ table apparatus in which three drive units move the movable table. One of the three drive units exerts the drive force in the X-direction to the movable table, and the other two drive units apply the drive forces in the Y-direction that is perpendicular to the X-direction to the movable table. Then, any combination of the exerted amount and direction of these drive forces enables the linear movements of the movable table in various directions, and in addition, enables a rotational movement with respect to an arbitrary point (for example, the center of the movable table) as the center of rotation.

CITATION LIST

Patent Literature

PLT 1: JP H11-245128 A
PLT 2: JP 2004-301256 A

SUMMARY

Technical Problem

The XYθ table apparatus disclosed in Patent Literatures 1 and 2, however, includes one drive unit that exerts the drive force in the X-direction to the movable table, and the drive unit is located on the side of one end part in the Y-direction of the movable table to apply the drive force in the X-direction to the one end part in the Y-direction of the movable table. Therefore, when the drive unit exerts the drive force in the X-direction to the one end part in the Y-direction of the movable table, the one end part in the Y-direction of the movable table starts moving immediately, but the other end part in the Y-direction of the movable table starts moving later than the one end part in the Y-direction. Hence, there is a drawback that the positioning accuracy of the movable table is low. This drawback becomes more remarkable, as a mounted object such as a work to be mounted on the movable table is upsized and the movable table is upsized.

By using four drive units so that two drive units apply the drive forces in the X-direction to the movable table and the other two drive units apply the drive forces in the Y-direction to the movable table, the above drawback will not occur. However, there is another drawback that one drive unit is additionally included and increases the cost.

Thus, the present invention has been made to address the above drawbacks of the known art, and has an object to provide an XYθ table apparatus having excellent positioning accuracy, even when three drive units are arranged to apply the drive forces to the movable table.

Solution to Problem

In order to address the above drawbacks, according to one aspect of the present invention, there is provided an XYθ table apparatus including: a base having a flat surface; a movable table configured to linearly and rotationally move in a movement plane above the base in parallel to the flat surface; a plurality of plane guide bearings arranged between the base and the movable table to support the movable table above the base such that the movable table is capable of linearly and rotationally moving; three drive units arranged above the base, and configured to respectively exert drive forces to the movable table to move the movable table; a coupling unit configured to couple each of the three drive units and the movable table to be capable of relatively moving in a swinging manner and in a sliding manner. The three drive units includes: a first drive unit configured to advance or recede in an X-direction in the movement plane, and to exert the drive force in the X-direction to the movable table; and two second drive units configured to advance or recede in a Y-direction, which is perpendicular to the X-direction, in the movement plane, and to exert the drive forces in the Y-direction to the movable table, the first drive unit is arranged to exert the drive force in the X-direction to a center position in the Y-direction of one of end parts in the X-direction of the movable table, the two second drive units are arranged to be point-symmetric with respect to a center of the movable table as a symmetry center, and the plurality of plane guide bearings are arranged at positions where a total sum of moment forces of the plurality of plane guide bearings is zero on a center axis line in the X-direction of the movable table, each of the moment forces of the plurality of plane guide bearings being calculated by multiplying a frictional force generated at each of the plurality of plane guide bearings by a movement of the movable table by a distance in the Y-direction between each of the plurality of plane guide bearings and the first drive unit.

In the above-described XYθ table apparatus, the two second drive units may be respectively arranged at both of the end parts in the X-direction of the movable table. In this case, the movable table may have a substantially rectangular shape that is long in the X-direction.

In the above-described XYθ table apparatus, the movable table may have a substantially rectangular shape that is long in the X-direction, and the plurality of plane guide bearings may be arranged at positions to be line-symmetric with respect to the center axis line in the X-direction of the movable table as the symmetry center.

Advantageous Effects

The XYθ table apparatus in the present invention has excellent positioning accuracy, even when three drive units are arranged to apply the drive forces to the movable table.

BRIEF DESCRIPTION OF DRAWINGS

FIG. 5 a plan view illustrating a configuration of an XYθ table apparatus in a second embodiment of the present invention.

DESCRIPTION OF EMBODIMENTS

Figure 1:
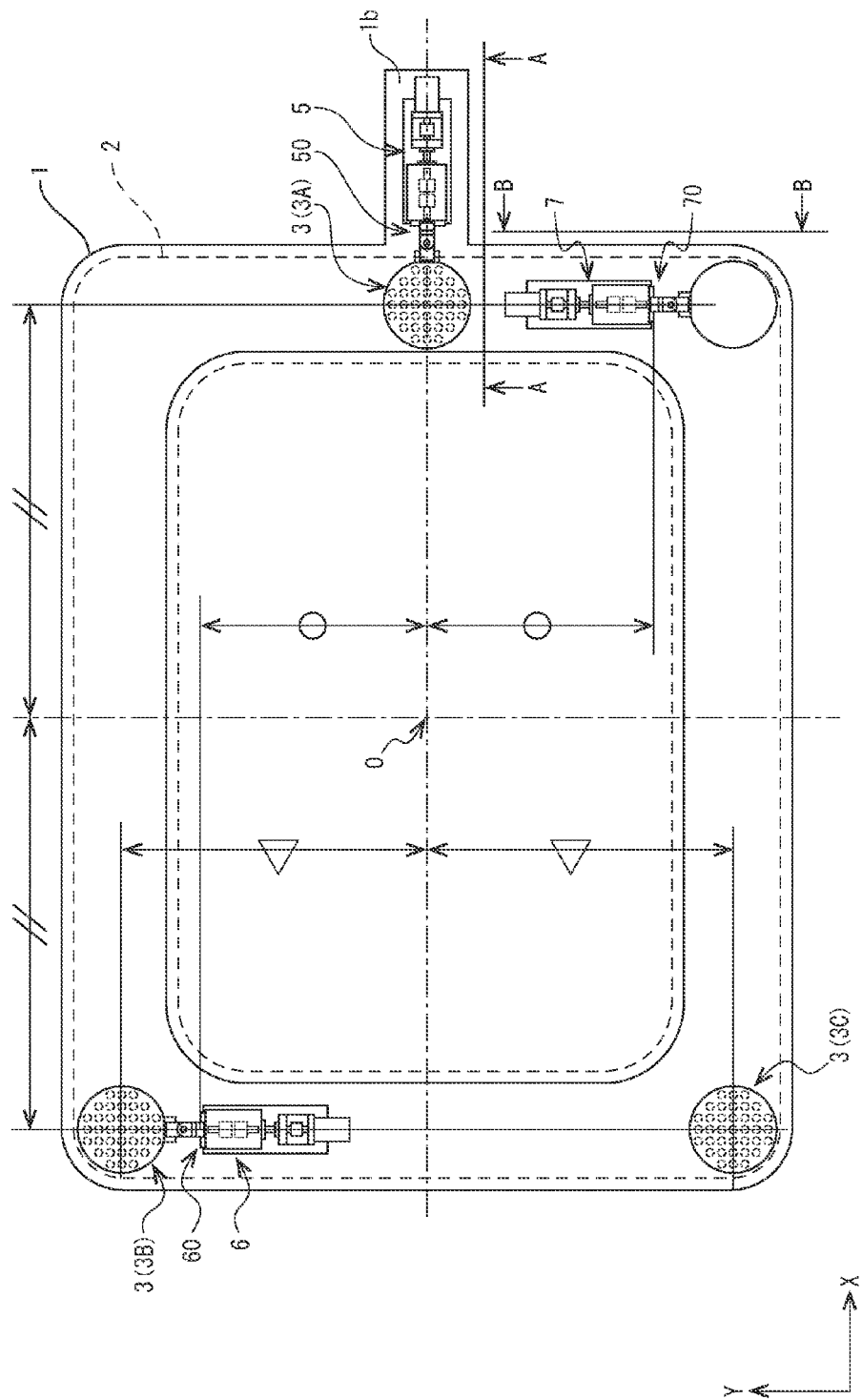
FIG. 1 is a plan view illustrating a configuration of an XYθ table apparatus in a first embodiment of the present invention.

Embodiments of an XYθ table apparatus in the present invention will be described in detail. It is to be noted that in each of the drawings to be referred to in the description hereinafter, same or corresponding parts have same reference numerals.

First Embodiment

A configuration of the XYθ table apparatus in a first embodiment will be described with reference to FIG. 1 to FIG. 4. FIG. 1 is a plan view illustrating a configuration of the XYθ table apparatus in the first embodiment. For purposes of the description, a movable table 2 is indicated by a broken line, whereas the drive units 5, 6, and 7 and a plane guide bearing 3 each located at a lower side of the movable table 2 are indicated by solid lines. In addition, a coupling plate 40 and a height adjustment unit 41 are arranged on the plane guide bearing 3, but the coupling plate 40 and the height adjustment unit 41 are not illustrated in FIG. 1 and FIG. 4.

The XYθ table apparatus in the first embodiment includes a plate-shaped base 1 having, for example, a substantially rectangular shape, and a plate-shaped movable table 2 having, for example, a substantially rectangular shape arranged above a plane top surface 1a (corresponding to "flat surface" that is a component of the present invention) of the base 1, such that the base 1 and the movable table 2 is arranged to be parallel to each other.

Between the top surface 1a of the base 1 and the bottom surface of the movable table 2, plural (three is illustrated in an example of FIG. 1, but four or more can be provided) plane guide bearings 3 (3A, 3B, and 3C) are arranged. Then, the movable table 2 is supported by the plane guide bearing 3 above the base 1, and in addition, the movable table 2 is movable over the top surface 1a of the base 1 through the plane guide bearing 3. The movable table 2 is guided on the plane by the plane guide bearing 3, so that the movable table 2 linearly and rotationally moves on a moving plane parallel to the top surface 1a of the base 1.

The type of the plane guide bearing 3 is not limited in particular, but for example, a rolling bearing (ball bearing or roller bearing), a plain bearing, a fluid bearing can be used. In the first embodiment, as it is understood from FIG. 1 and FIG. 2, a ball bearing having a configuration in which plural pockets (apertures) 33 of a disc-shaped retainer 31 respectively retain rolling elements (balls) 35 and they are sandwiched by two plates 37 is used.

Figure 2:
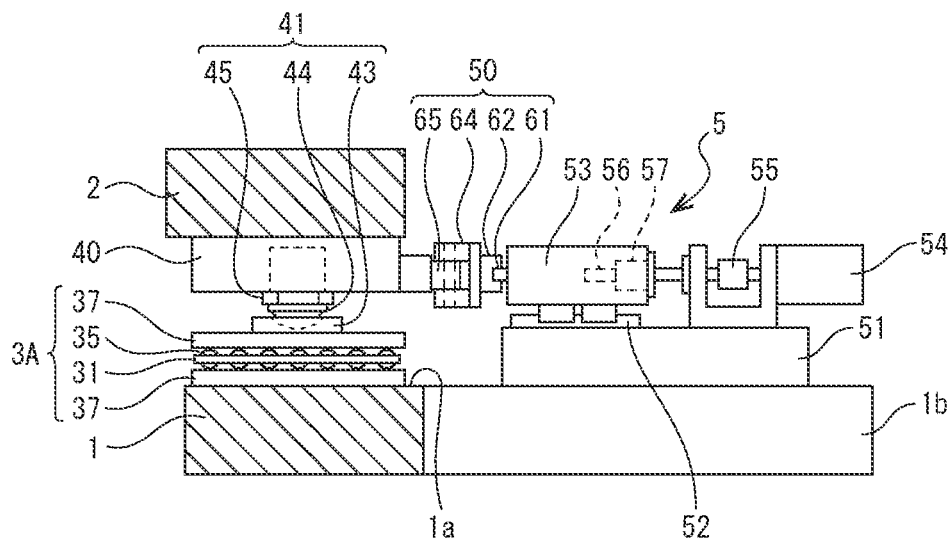
FIG. 2 is a cross-sectional view taken along a line A-A in FIG. 1.
Figure 3:
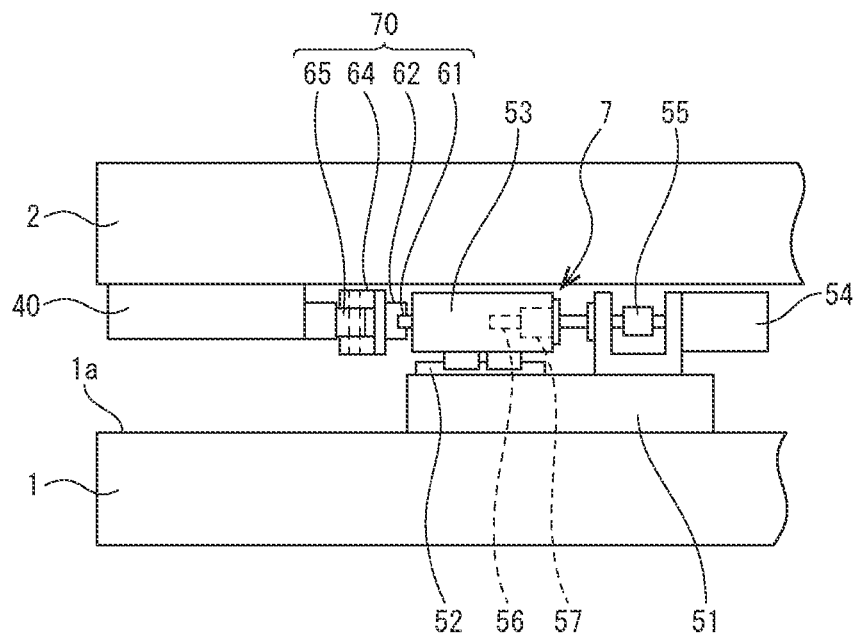
FIG. 3 is a view when viewed from an arrow B-B in FIG. 1.
Figure 4:
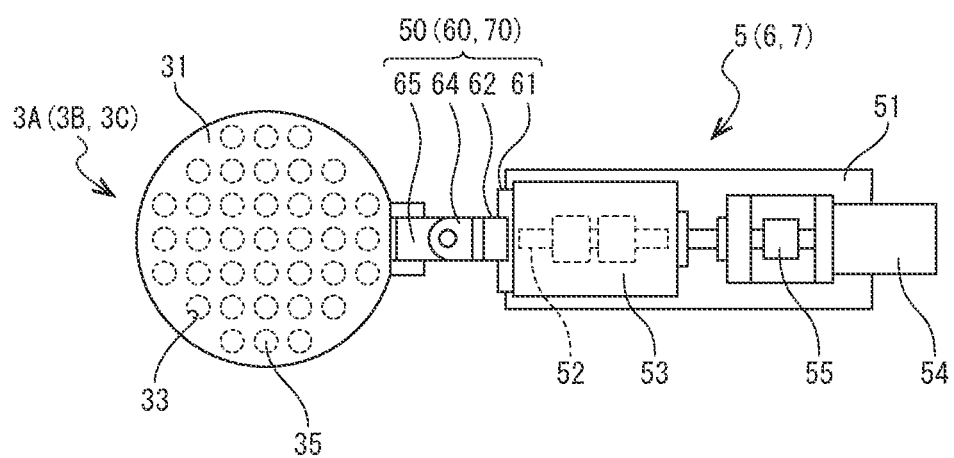
FIG. 4 is a plan view of a drive unit.

It is to be noted that as illustrated in FIG. 2, the coupling plate 40 and the height adjustment unit 41 are arranged between the movable table 2 and the plane guide bearing 3. In other words, the plane guide bearing 3 is arranged on the base 1, the height adjustment unit 41 is arranged on the plane guide bearing 3, the coupling plate 40 is attached on the height adjustment unit 41, and the movable table 2 is secured onto the coupling plate 40.

The height adjustment unit 41 includes a spherical seat (or a taper seat) 43 arranged on the plane guide bearing 3, a spherical bolt 44 screw inserted into the coupling plate 40 with a spherical convex surface being engaged with a spherical concave surface (or a taper-shaped concave surface) of the spherical seat (or the taper seat) 43, and a nut 45 that secures the spherical bolt 44 to the coupling plate 40, so that the height of the movable table 2 can be adjusted by the height adjustment unit 41 at a desired position. The spherical bolt 44 is screw inserted into the coupling plate 40, the height of the movable table 2 is adjusted, and then the spherical bolt 44 is secured with the nut 45. Thus, the height of the movable table 2 is adjustable at the desired position.

In addition, the height adjustment unit 41 is capable of adjusting an inclination of the top surface of the movable table 2, and thus also serves as a declination absorption mechanism, as will be described later. The spherical bolt 44 is screw inserted into the coupling plate 40, the inclination of the movable table 2 is adjusted by the spherical concave surface (or taper-shaped concave surface) and the spherical convex surface, and then the spherical bolt 44 is secured with the nut 45, so that the inclination of the movable table 2 is adjustable at a desired angle.

Above the base 1, three drive units 5, 6, and 7 configured to apply the drive forces to the movable table 2 and to move the movable table 2 are arranged on an identical plane. One of the three drive units 5, 6, and 7 is a first drive unit 5 configured to advance or recede in the X-direction (see FIG. 1) in the movement plane, and to apply a drive force in the X-direction to the movable table 2, whereas the other two drive units are second drive units 6 and 7 configured to advance or recede in the Y-direction (that is a direction in the movement plane) that is perpendicular to the X-direction, and to apply the drive forces in the Y-direction to the movable table 2.

The configurations of the three drive units 5, 6, and 7 are almost same. Hence, as an example, the first drive unit 5 will be described in detail with reference to FIG. 2. A base 51 for the drive unit is arranged on the base 1, and a linear guide rail 52 for the drive unit is arranged on the base 51 for the drive unit such that the linear guide rail 52 extends in the X-direction (whereas the second drive units 6 and 7 extend in the Y direction). Above the guide rail 52 for the drive unit, a slider 53 for the drive unit is arranged along the guide rail 52 for the drive unit in the X-direction (whereas the second drive units 6 and 7 extend in the Y direction) so that the slider 53 can move linearly.

A ball screw nut 57 is secured to the slider 53 for the drive unit. When rotation of a motor 54 is input into a threaded shaft 56 of the ball screw mechanism through a coupling 55, the slider 53 for the drive unit is configured to advance or recede in the X-direction along the guide rail 52 for the drive unit (whereas the second drive units 6 and 7 advance or recede in the Y direction) through the nut 57 of the ball screw mechanism.

In addition, the first drive unit 5, as illustrated in FIG. 2, is coupled with the coupling plate 40 secured at the bottom surface of the movable table 2 through a coupling unit 50 (whereas the second drive units 6 and 7 are respectively coupled through coupling units 60 and 70). The first drive unit 5 and the second drive unit 6 are coupled with the coupling plate 40, after the height and the inclination of the movable table 2 are respectively adjusted by the height adjustment unit 41 at desired values.

Furthermore, when the first drive unit 5 and the coupling plate 40 are coupled to each other, the coupling plate 40 rotates with respect to an axis in the Y-direction as a rotation axis and may incline not to be parallel to the movement plane (an inclination may be generated in a pitching direction). However, since a declination absorption mechanism to absorb such an inclination in the pitching direction (for example, a mechanism of attaching the coupling unit 50 and the coupling plate 40 to be swingable with respect to the axis in the Y-direction as the rotation axis) is arranged between the coupling plate 40 and the coupling unit 50 (specifically, a second swing member 65, as will be described later), the coupling plate 40 and the first drive unit 5 can be coupled without a problem. In the first embodiment, the height adjustment unit 41 (including the spherical seat 43, the spherical bolt 44, and the nut 45) also serves as the declination absorption mechanism.

Furthermore, when the first drive unit 5 and the coupling plate 40 are coupled with each other, the coupling plate 40 rotates with respect to an axis in the X-direction as a rotation axis and may incline not to be parallel to the movement plane (an inclination may be generated in a rolling direction). However, since an inclination absorption mechanism to absorb such an inclination in the rolling direction (for example, a mechanism of attaching the coupling unit 50 and the coupling plate 40 to be rotatable with respect to the axis in the X-direction as the rotation axis) is arranged between the coupling plate 40 and the coupling unit 50 (specifically, the second swing member 65, as will be described later), the first drive unit 5 and the coupling plate 40 can be coupled to each other without a problem.

It is to be noted that as it is understood from FIG. 1, the plane guide bearings 3 (3A and 3B) are arranged below the coupling plate 40 with which the first drive unit 5 and one of the second drive units 6 are coupled. As it is understood from FIG. 3, however, the plane guide bearing 3 is not arranged below the coupling plate 40 which the other second drive unit 7 is coupled. The plane guide bearing 3 is not necessarily arranged below the coupling plate 40 with which the drive units 5, 6, or 7 is coupled. Like the plane guide bearing 3C, the plane guide bearing 3 may be arranged at a different position from the coupling plate 40 with which the drive unit 5, 6, or 7 is coupled.

The coupling units 50, 60, and 70 are configured to respectively couple the drive units 5, 6, and 7 and movable table 2 to enable a relative swinging movement and a relative sliding movement in the movement plane. Since the configurations of the coupling units 50, 60, and 70 are substantially same, the coupling unit 50 will be described in detail, as an example. The coupling unit 50 includes a rotation guide mechanism to enable the relative swinging movement of the first drive unit 5 and the movable table 2, and a linear guide mechanism to enable the relative sliding movement of the first drive unit 5 and the movable table 2.

The slider 53 for the drive unit of the first drive unit 5 includes a guide rail 61 for the coupling unit at a part facing the movable table 2. The guide rail 61 extends in the Y-direction (whereas the second drive units 6 and extend in the X-direction). A slider 62 for the coupling unit is attached at the guide rail 61 for the coupling unit to be capable of linearly moving in the Y-direction along the guide rail 61 for the coupling unit. The guide rail 61 and the slider 62 for the coupling unit are included in the linear guide mechanism that enables the relative sliding movement of the first drive unit 5 and the movable table 2 in the Y-direction (whereas the second drive units 6 and 7 move in the X-direction).

In addition, a first swing member 64 is attached to the slider 62 for the coupling unit, whereas the second swing member 65 is attached to the coupling plate 40. The first swing member 64 and the second swing member 65 are coupled to enable relative swing movements in the movement plane (which is a rotation with respect to an axis in a direction perpendicular to the movement plane (the vertical direction in FIG. 2) as the rotation axis, and which is called yawing movement) through a bearing (for example, a ball bearing, a roller bearing, or a sliding bearing) and a leaf spring. The first swing member 64 and the second swing member 65 configure a rotation guide mechanism that enables the relative swing movement of the first drive unit 5 and the movable table 2.

Next, arrangements of the drive units 5, 6, and 7 will be described. The first drive unit 5 is arranged to apply a drive force in the X-direction to the center position in the Y-direction (the center position in the shorter direction of the movable table 2, in the example of FIG. 1) of one end part in the X direction of the movable table 2 (a right end part in the longer direction of the movable table 2, in an example of FIG. 1). In other words, the first drive unit 5 is arranged at the center position in the Y-direction (the center position in the shorter direction, in the example of FIG. 1) of one end part in the X-direction of the base 1 (the right end part in the longer direction, in the example of FIG. 1). It is to be noted that the first drive unit 5 has an elongated shape in an advancing and receding direction. Hence, in order to mount the first drive unit 5, the base 1 includes a protrusion portion 1b protruding outwardly in the X-direction (see FIG. 1 and FIG. 2). The outwardly protruding length in the X-direction of the protrusion portion 1b is substantially identical to the advancing and receding length of the first drive unit 5.

The gravity center of the movable table 2 is arranged on the center axis line in the X-direction of the movable table 2. Hence, by exerting the drive force in the X-direction to the center position in the Y-direction of the one end part in the X-direction of the movable table 2, the drive force in the X-direction can be exerted to the gravity center of the movable table 2. Therefore, by use of the first drive unit 5, the movable table 2 can be moved in the X-direction properly, without causing a deviation or a rotation in the moving direction.

It is to be noted that when the movable table 2 is made to move in the X-direction, the linear guide mechanisms of the coupling units 60 and 70 function to enable the relative sliding movements of the second drive units 6 and 7 and the movable table 2. In other words, while the movable table 2 is moving linearly in the X-direction, the sliders 62 for the coupling unit of the second drive units 6 and 7 linearly move in the X-direction along the guide rails 61 for the coupling units, respectively. Accordingly, the movable table 2 is capable of moving linearly in the X-direction without a movement of the second drive unit 6 or 7.

On the other hand, two second drive units 6 and 7 are arranged to be point-symmetric with respect to the center O of the movable table 2. In the first embodiment, the second drive units 6 and 7 are respectively arranged at both end parts in the X-direction of the movable table 2. In more detail, the second drive unit 6 is arranged at one end position in the Y-direction (an upper end position in the shorter direction, in the example of FIG. 1) of the other end part in the X-direction of the base 1 (a left end part in the longer direction of the base 1, in the example of FIG. 1). In addition, the second drive unit 7 is arranged at the other end position in the Y-direction (a lower end position in the shorter direction, in the example of FIG. 1) of one end part in the X-direction of the base 1 (a right end part in the longer direction of the base 1, in the example of FIG. 1).

Therefore, since the second drive units 6 and 7 are point-symmetric with respect to the center O of the movable table 2, the distance in the X-direction to the center O of the movable table 2 and the distance in the Y-direction thereto are identical, as illustrated in FIG. 1.

By moving the sliders 53 of the second drive units 6 and 7 at an identical speed in an identical direction for an identical distance, the movable table 2 can be moved in the Y-direction precisely without causing a deviation or a rotation in the moving direction.

It is to be noted that when the movable table 2 is made to move in the Y-direction, the linear guide mechanism of the coupling unit 50 function to enable the relative sliding movements of the first drive unit 5 and the movable table 2.

In other words, while the movable table 2 is moving linearly in the Y-direction, the slider 62 for the coupling unit of the first drive unit 5 moves linearly in the Y-direction along the guide rail 61 for the coupling unit. Accordingly, the movable table 2 is capable of moving linearly in the Y-direction without a movement of the first drive unit 5.

In addition, by moving the slider 53 for the drive unit of the first drive unit 5 at the same time with moving the slider 53 for the drive units of the second drive units 6 and 7 at an identical speed in an identical direction for an identical distance, the movable table 2 can be moved in an oblique direction (in an inclined direction with respect to the X-direction and the Y-direction). In this case, the moving direction of the movable table 2 can be changed in various ways depending on the ratio of a moving distance of the sliders 53 of the second drive units 6 and 7 and a moving distance of the slider 53 of the first drive unit 5.

It is to be noted that when the movable table 2 is made to move in an oblique direction, the linear guide mechanisms of the coupling units 50, 60, and 70 function to enable the relative sliding movements of the drive units 5, 6, and 7 and the movable table 2. In other words, while the movable table 2 is linearly moving in an oblique direction, the sliders 62 for the coupling units of the drive units 5, 6, and 7 move linearly along the guide rail 61 for the coupling units, respectively. Accordingly, the movable table 2 is capable of moving linearly in an oblique direction without a movement of the drive unit 5, 6, or 7.

Further, in moving the sliders 53 for the drive units of the second drive units 6 and 7, at least one of the moving direction or the moving speed is made different. Then, by moving the slider 53 for the drive unit of the first drive unit 5 at the same time with moving the slider 53 for the drive units of the second drive units 6 and 7, the movable table 2 can be rotationally moved. It is to be noted that the movable table 2 can be rotationally moved without driving one of the drive unit 5, 6, or 7. In addition, by driving one of the second drive unit 6 or 7, the movable table 2 can be rotationally moved without driving the first drive unit 5.

In this situation, the rotational center position, the rotational speed, and the rotational amount in the rotational movement of the movable table 2 can be changed in various ways by setting what combination of the moving directions and the moving speeds of the slider 53 for the drive unit of the second drive unit 6 and the slider 53 for the drive unit of the second drive unit 7, or by setting what combination of the moving direction and the moving speed of the slider 53 for the drive unit of the first drive unit 5, with respect to the moving directions and moving speeds of the sliders 53 for the drive units of the second drive units 6 and 7.

It is to be noted that when the movable table 2 is made to rotationally move, the linear guide mechanisms of the coupling units 50, 60, and 70 function to enable the relative sliding movements of the drive units 5, 6, and 7 and the movable table 2, and also the rotation guide mechanisms of the coupling units 50, 60, and 70 function to enable the relative swinging movements of the drive units 5, 6, and 7 and the movable table 2. In other words, while the movable table 2 is moving, the sliders 62 for the coupling units of the drive units 5, 6, and 7 moves linearly along the guide rails 61 for the coupling units, and also the first swing member 64 and the second swing member 65 make the relative swing movements in the movement plane. Accordingly, the movable table 2 is capable of moving rotationally without a movement of the drive unit 5, 6, or 7.

Next, an arrangement of the plane guide bearings 3A, 3B, and 3C will be described. The plane guide bearings 3A, 3B, and 3C are arranged at positions such that the total sum of moment forces generated by the frictional forces of the plane guide bearings 3A, 3B, and 3C in accordance with the movement of the movable table 2 becomes zero on the center axis line in the X-direction of the movable table 2. The moment forces generated by the frictional forces of the plane guide bearings 3A, 3B, and 3C is calculated by multiplying the frictional forces generated at the plane guide bearings 3A, 3B, and 3C by the movement of the movable table 2 by the distance in the Y-direction from the plane guide bearings 3A, 3B, and 3C to the first drive unit 5. The moment forces generated by the frictional forces of the plane guide bearings 3A, 3B, and 3C can be respectively calculated to sum up the calculated values.

Specifically, the plane guide bearing 3A is arranged at the center position in the Y-direction (the center position in the shorter direction, in the example of FIG. 1) at one end part in the X-direction of the base 1 (a right end part in the longer direction, in the example of FIG. 1). In addition, the plane guide bearing 3B is arranged at one end position in the Y-direction (an upper end position in the shorter direction, in the example of FIG. 1) of the other end part in the X-direction of the base 1 (a left end part in the longer direction of the base 1, in the example of FIG. 1). Further, the plane guide bearing 3C is arranged at the other end part in the Y-direction (a lower end position in the shorter direction, in the example of FIG. 1) of the other end part in the X-direction of the base 1 (a left end part in the longer direction of the base 1, in the example of FIG. 1). As illustrated in FIG. 1, the plane guide bearings 3B and 3C are configured such that the distances in the Y-direction to the center O of the movable table 2 are identical to each other.

The plane guide bearings 3A, 3B, and 3C are arranged at positions to be line-symmetric with respect to the center axis line in the X-direction of the movable table 2 as the center of symmetry. Thus, the total sum of the moment forces generated by the frictional forces of the plane guide bearings 3A, 3B, and 3C in accordance with the movement of the movable table 2 becomes zero on the center axis line in the X-direction of the movable table 2.

Also, in the linear guide mechanisms of the coupling units 60 and 70, the moment force is generated on the center axis line in the X-direction of the movable table 2 by the frictional force generated in accordance with the movement of the movable table 2. However, the second drive units 6 and 7 are arranged as described above to be point-symmetric with respect to the center O of the movable table 2 as the center of symmetry (from the coupling units 60 and 70 of the second drive units 6 and 7, the distances to the center O of the movable table 2 in the X-direction and the Y-direction are identical to each other, as illustrated in FIG. 1). Hence, the total sum of the moment forces generated by the frictional forces of the linear guide mechanisms of the coupling units 60 and 70 in accordance with the movement of the movable table 2 becomes zero on the center axis line in the X-direction of the movable table 2.

The moment forces generated in the linear guide mechanisms of the coupling units 60 and 70 are calculated by multiplying the frictional forces generated in the linear guide mechanisms of the coupling units 60 and 70 in accordance with the movement of the movable table 2 by the distances in the Y-direction from the coupling units 60 and 70 to the first drive unit 5. The moment forces of the coupling units 60 and 70 can be calculated respectively to sum up the calculated values.

When the moment force is exerted on the movable table 2, the load in the advancing and receding direction is exerted to the second drive units 6 and 7, and displacements of the second drive units 6 and 7 occur depending on the rigidity in the advancing and receding direction. When the displacement occurs at the second drive units 6 and 7, even when the second drive units 6 and 7 are driven, a dead zone area where the movable table 2 does not move for the displacement is generated. Such a dead zone area becomes a factor of decreasing the positioning accuracy or a factor of disturbing minute feeding.

To prevent the generations of such problems, it is effective to exert the drive force to the gravity center of the movable table 2, to enhance the rigidities in the advancing and receding directions of the drive units 5, 6, and 7, and to increase the distance in the X-direction between the second drive units 6 and 7.

Since the XYθ table apparatus in the first embodiment includes the above effective configuration, when the movable table 2 moves, the moment force generated on the center axis line in the X-direction of the movable table 2 becomes zero by the frictional forces of the linear guide mechanisms of the plane guide bearings 3A, 3B, and 3C and the coupling units 60 and 70. Therefore, the movable table 2 can be moved with well-balanced and excellent positioning accuracy. Here, in order to enhance the rigidity in the moment direction, it is important to ensure attachment spans (the distances in the X-direction) of the linear guide mechanisms of the coupling units 60 and 70 that receive the moment forces as horizontal loads.

In the first embodiment, large attachment spans of the linear guide mechanisms of the coupling units 60 and 70 are ensured by arranging the second drive units 6 and 7 at both end parts in the X-direction of the movable table 2, respectively. Since the distances in the X-direction (attachment spans) between the second drive units 6 and 7 are long, the rigidity in the moment direction is high. Therefore, even if the moment force is exerted on the movable table 2, the positioning accuracy is hardly degraded. In addition, such long distances contribute to downsizing of the drive units 5, 6, and 7. As the drive unit is smaller, the rigidity in the advancing and receding direction is lower, whereas as the attachment span is larger, the load in the advancing and receding direction to be exerted to the drive unit is smaller. Therefore, the drive unit can be downsized.

It is to be noted that the higher rigidity in the advancing and receding direction of the first drive unit 5 may be desirable, although it depends on the accuracy. On the other hand, the rigidities in the advancing and receding direction of the second drive units 6 and 7 can be about 50% the rigidity in the advancing and receding direction of the first drive unit 5, because the second drive units 6 and 7 are arranged to be parallel to each other, unless a large moment force does not act. Therefore, it is possible to downsize the second drive units 6 and 7.

Such an XYθ table apparatus is capable of moving the movable table 2 on which a mounted object such as a work or the like is mounted and positioning the mounted object with high accuracy. In addition, the arrangements of the drive units 5, 6, and 7 and the plane guide bearings 3A, 3B, and 3C are optimized. Therefore, in addition to the high rigidity in the moment direction, the XYθ table apparatus has excellent positioning accuracy, although three drive units 5, 6, and 7 exert the drive forces to the movable table 2.

Such an XYθ table apparatus can be applied to various manufacturing devices, test devices, optical devices, medical devices, and the like, and can be used as an alignment table of, for example, a semiconductor manufacturing device, a liquid crystal manufacturing device, an exposure device, a printing device, a coating device, a chip mounter, a fine laser processing device, and the like. As a specific example, an alignment table of the exposure device or the test device of a printed circuit board can be given.

These days, as a liquid crystal panel is increasingly upsized, the XYθ table apparatus used in the manufacturing of the liquid crystal panel or the like is also upsized. However, as there is a limitation in dimension of the rear deck of a vehicle such as a truck to be used for transporting the XYθ table apparatus, the size of the XYθ table apparatus also has a limitation. The Xθ table apparatus has a substantially rectangular shape in the first embodiment and the shorter side thereof has to have a predetermined size or smaller, but in a case where the longer side thereof can be upsized to some extent, it is very effective to arrange the drive units 5, 6, and 7 and the plane guide bearings 3A, 3B, and 3C, as described in the first embodiment.

It is to be noted that cases where the moment force is exerted on the movable table 2 include as follows.

A case where an external force is exerted on the movable table 2.

A case where when the first drive unit 5 exerts the drive force in the X-direction to the movable table 2, the total sum of the moment forces generated in the linear guide mechanisms of the plane guide bearings 3A, 3B, and 3C and the coupling units 60 and 70 by the movement of the movable table 2 does not become zero on the center axis line in the X-direction of the movable table 2, because of a part accuracy error or an attachment error in the assembling.

A case where the loads to be exerted to the plane guide bearings 3A, 3B, and 3C are different because of an imbalance of the loads of the object mounted on the movable table 2.

Second Embodiment

A configuration of the XYθ table apparatus in a second embodiment will be described with reference to FIG. 5. FIG. 5 is a plan view illustrating a configuration of the XYθ table apparatus in the second embodiment. For purposes of description, however, the movable table 2 is indicated by a broken line, whereas the drive units 5, 6, and 7 and the plane guide bearing 3 located at a lower side of the movable table 2 are indicated by solid lines. In addition, the coupling plate 40 and the height adjustment unit 41 are arranged on the plane guide bearing 3, but the coupling plate 40 and the height adjustment unit 41 are not illustrated in FIG. 5.

In the first embodiment, the protrusion portion 1b for mounting the first drive unit 5 is arranged at the base 1, but in order to prevent the protrusion length outwardly in the X-direction of the protrusion portion 1b from becoming longer, the first drive unit 5 may be arranged to advance or recede in the Y-direction (see FIG. 5). In this case, the first drive unit 5 having an elongated shape in the advancing and receding direction can be arranged on the base 1 where a protrusion portion 1c having a shorter protrusion length outwardly in the X-direction is provided. The protrusion length outwardly in the X-direction of the protrusion portion 1c is substantially identical to the length that is perpendicular to the advancing and receding direction of the first drive unit 5 (the X-direction, in the example of FIG. 5).

In this case, a direction change mechanism configured to convert the drive force of the first drive unit 5 that advances or recedes in the Y-direction into the drive force in the X-direction is arranged between the movable table 2 and the first drive unit 5. In detail, a slider 53 for the drive unit of the first drive unit 5 is divided into two pieces, and the direction change mechanism is arranged between sliders 53A and 53B for the drive units.

The two sliders 53A and 53B for the drive units respectively include inclined surfaces 59 that extend obliquely with respect to the X-direction and Y-direction. These inclined surfaces 59 are in contact with each other, and both of the inclined surfaces 59 are included in a cam mechanism.

When the slider 53A for the first drive unit, which is a far side from the movable table 2 is made to move in the Y-direction, the slider 53B for the second drive unit, which is a near side from the movable table 2, moves in the X-direction by the cam mechanism (the wedge effect) including both of the inclined surfaces 59. In other words, a force is transmitted to the inclined surface 59 of the slider 53B for the second drive unit from the inclined surface 59 of the slider 53A for the first drive unit, and then the drive force in the Y-direction is converted into the drive force in the X-direction. Thus, the drive force in the X-direction is exerted to the movable table 2.

To arrange the first drive unit 5 at a lower side of the movable table 2, the second drive units 6 and 7 and the plane guide bearings 3A, 3B, and 3C are arranged to be line-symmetric with the center axis line in the Y-direction of the movable table 2 being used as the symmetry center, unlike the arrangement positions in the first embodiment. Depending on the condition such as a space, a stroke, or the like, the second drive units 6 and 7 and the plane guide bearings 3A, 3B, and 3C may be arranged at positions same as those in the first embodiment.

It is to be noted that in the first and second embodiments, examples of the present invention have been described, and the present invention is not limited to the first and second embodiments. For example, the shapes of the base 1 and the movable table 2 are not limited in particular, and any quadrangular shape (for example, square) other than a rectangular shape may be employed. In addition, not only any quadrangular shape, but also, for example, any other polygonal shape such as a triangular shape, a pentagonal shape, or a hexagonal shape may be employed. Furthermore, a circular shape or an oval shape may be employed. Moreover, the shapes of the base 1 and the movable table 2 may not be identical, and may be different.

In addition, the plane guide bearing 3 is not limited to the above-described rolling bearing, but any combination of the linear guide device and the rotation guide device may be used. As specific examples of the plane guide bearing, the following bearings (not illustrated) will be given. A first linear guide rail is secured on the lower member to be the base, and the moving body is attached on the first guide rail to be movable along the first guide rail via a bearing such as a rolling bearing, a sliding bearing, or the like. On the moving body, a second linear guide rail extending in a direction that is perpendicular to the first linear guide rail is attached via the bearing such as the rolling bearing, the sliding bearing, or the like, so that the second linear guide rail is capable of moving in the direction that is perpendicular to the first guide rail.

In addition, a first bearing ring is secured on the second linear guide rail, and a second bearing ring is attached to the first bearing ring to be capable of relatively rotating via rolling elements such as balls, rollers, or the like. Then, an upper member is secured on the second bearing ring. The rolling bearing includes the first bearing ring, the second bearing ring, and the rolling elements, so that the upper member is supported to be rotatable with respect to the second guide rail.

In a case where such a plane guide bearing is applied to an XYθ table apparatus, the lower member of the plane guide bearing is secured to the top surface 1a of the base 1, and the upper member is secured to the bottom surface of the movable table 2. Accordingly, the movable table 2 of the XYθ table apparatus is guided to the plane guide bearing, and becomes capable of linearly and rotationally moving on the base 1. In detail, the linear guide device including the first guide rail, the second guide rail, and the moving body enables the linear movement of the movable table 2, and the rotation guide device including the first bearing ring, the second bearing ring, and the rolling elements enables the rotational movement of the movable table 2.

It is to be noted that also in a case where the plane guide bearing includes a combination of the linear guide device and the rotational guide device, the number and the arrangement position is not limited in particular, as far as the total sum of the moment forces is zero on the center axis line in the X-direction of the movable table 2 in a similar manner to the plane guide bearing 3 including the above-described rolling bearing.

Further, various changes or improvements can be added to the first and second embodiments, and such changes or improvements can be included in the present invention.

REFERENCE SIGNS LIST 1 base
1a top surface
2 movable table
3 (3A, 3B, 3C) plane guide bearing
5 first drive unit
6 second drive unit
7 second drive unit
50 coupling unit
60 coupling unit
70 coupling unit

The invention claimed is:
1. An XYθ table apparatus comprising:
a base having a flat surface;
a movable table configured to linearly and rotationally move in a movement plane above the base in parallel to the flat surface;
a plurality of plane guide bearings arranged between the base and the movable table to support the movable table above the base such that the movable table is capable of linearly and rotationally moving;
three drive units arranged above the base, and configured to respectively exert drive forces to the movable table to move the movable table;
a coupling unit configured to couple each of the three drive units and the movable table to be capable of relatively moving in a swinging manner and in a sliding manner;
wherein the three drive units are comprised of:
a first drive unit configured to advance or recede in an X-direction in the movement plane, and to exert the drive force in the X-direction to the movable table; and
two second drive units configured to advance or recede in a Y-direction, which is perpendicular to the X-direction, in the movement plane, and to exert the drive forces in the Y-direction to the movable table,
wherein the first drive unit is arranged to exert the drive force in the X-direction to a center position in the Y-direction of one of two end parts in the X-direction of the movable table,
wherein the two second drive units are arranged to be point-symmetric with respect to a center of the movable table as a symmetry center, and
wherein the plurality of plane guide bearings are arranged at positions where a total sum of moment forces of the plurality of plane guide bearings is zero on a center axis line in the X-direction of the movable table, each of the moment forces of the plurality of plane guide bearings being calculated by multiplying a frictional force generated at each of the plurality of plane guide bearings by a movement of the movable table by a distance in the Y-direction between each of the plurality of plane guide bearings and the first drive unit.

2. The XYθ table apparatus according to claim 1, wherein the two second drive units are respectively arranged at both of the end parts in the X-direction of the movable table.

3. The XYθ table apparatus according to claim 2, wherein the movable table has a substantially rectangular shape that is long longer in the X-direction.

4. The XYθ table apparatus according to claim 1,
wherein the movable table has a substantially rectangular shape that is long longer in the X-direction, and
wherein the plurality of plane guide bearings are arranged at positions to be line-symmetric with respect to the center axis line in the X-direction of the movable table as the symmetry center.

5. The XYθ table apparatus according to claim 2,
wherein the movable table has a substantially rectangular shape that is long longer in the X-direction, and
wherein the plurality of plane guide bearings are arranged at positions to be line-symmetric with respect to the center axis line in the X-direction of the movable table as the symmetry center.

6. The XYθ table apparatus according to claim 3,
wherein the movable table has a substantially rectangular shape that is long longer in the X-direction, and
wherein the plurality of plane guide bearings are arranged at positions to be line-symmetric with respect to the center axis line in the X-direction of the movable table as the symmetry center.

* * * * *